May 29, 1945.  J. PIEROTTI  2,376,937
VACUUM MOTOR SYSTEM
Filed Feb. 4, 1944
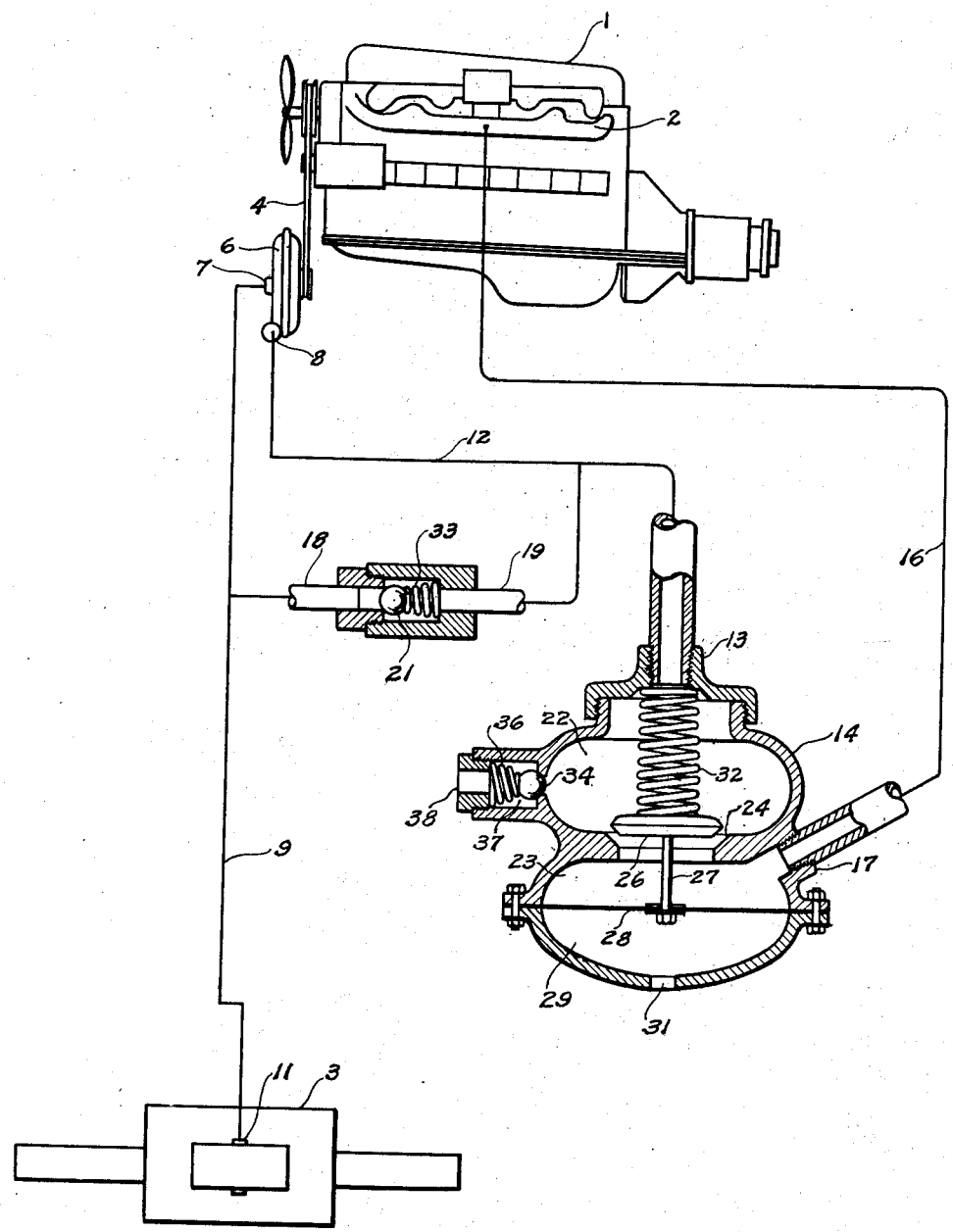
INVENTOR.
JOSEPH PIEROTTI.
BY Gardner & Warren
HIS ATTORNEYS Patented May 29, 1945

2,376,937

UNITED STATES PATENT OFFICE 2,376,937

VACUUM MOTOR SYSTEM

Joseph Pierotti, Oakland, Calif.

Application February 4, 1944, Serial No. 521,059

1 Claim. (Cl. 60—60)

The invention relates to a mechanism adapted for use with the intake manifold of an internal combustion engine for operatively connecting and motivating the vacuum motor of a refrigerating apparatus.

For the general object accomplished by a refrigerating apparatus of the character described, reference is made to my co-pending application, Serial No. 226,403, filed in the United States Patent Office on August 23, 1938, and now abandoned, and to United States Patent No. 2,209,090 issued on July 23, 1940, to applicant and Oscar C. Johnson. The refrigerating apparatus disclosed in the referenced application and patent, relies for its motivating power upon the reduced pressure in the intake manifold of an internal combustion engine. This source of energy has been and can be successfully used to produce substantial refrigeration particularly under some operating conditions of the engine, such as when the air valve of the carburetor is substantially closed. Under open conditions of the carburetor valve, however, this source of energy is substantially non-existent. This occurs generally at high engine speeds and also when ascending a hill under substantially full throttle conditions. As an object of the present invention, I provided an auxiliary source of reduced pressure which is, in a large measure, the complement of the reduced pressure at the intake manifold; that is, the auxiliary source is good when the intake manifold source is poor, and vice versa; and operatively connect the auxiliary source to the manifold-motor circuit so that the two sources are used jointly, or selectively, as the pressures thereof vary above and below a predetermined amount.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

The accompanying drawing is a diagrammatical representation of a lay-out including an internal combustion engine, a vacuum motor driven thereby, a vacuum driven pump for a refrigerating apparatus, and valve and conduit means for operative connecting the foregoing to provide the object hereinbefore stated.

The apparatus as illustrated in the accompanying drawing is adapted for use with an internal combustion engine 1 having an intake manifold 2 and with a vacuum motor compressor unit 3 for a refrigerating apparatus, not shown. The particular form of the engine 1 or the unit 3 is not significant in this invention. For convenience of illustration and understanding there is here shown a typical type automotive engine and the type of vacuum motor compressor illustrated and described in the above referenced application and patent, the patent being for this purpose a preferred reference. Suffice it to say here that the engine need merely have an intake manifold which is utilized in the present invention as a source of energy and the unit 3 need merely have a vacuum motor adapted for driving the compressor of a refrigerating system.

Operatively driven by the engine 1, as from the fan belt 4 thereof, is a vacuum pump 6 having intake and discharge ports 7 and 8 and being of a character to provide a decreasing pressure at the intake port 7 and increased capacity with increased engine speeds. This is a common characteristic of positive displacement and centrifugal vacuum pumps in general and consequently substantially any standard type vacuum pump may be used. For sake of illustration a vacuum pump of the general type illustrated and described in United States Patent No. 1,851,193 issued March 29, 1932, to Laraque will suffice.

The operating circuit here includes a conduit 9 connecting the discharge (power connection) port 11 of the vacuum motor 3 to the intake port 7 of the pump 6; a conduit 12 connecting the discharge port 8 of the pump 6 to one side 13 of a pressure-responsive flow-control valve mechanism 14; a conduit 16 connecting the opposite side 17 of the mechanism 14 to the intake manifold 2 of the engine 1; and conduits 18 and 19 connecting a check valve 21 to conduits 9 and 12 in a shunt circuit across the pump 6.

The mechanism 14 consists of a valve body formed with inlet and discharge chambers 22 and 23 positioned on opposite sides of an annular valve seat 24 and formed and provided at 13 and 17 for receipt of conduits 12 and 16 aforementioned. Positioned in chambers 22 for movement to and from the seat 14 is a valve 26 provided with a valve stem 27 extending through the seat opening and into the chamber 23 where the opposite end of the stem is supported centrally on a diaphragm 28 mounted across the chamber 23 and separating the latter from a chamber 29 ported to the atmosphere at 31.

In operation of the engine at low speeds and at substantially closed throttle the main source of energy for driving the motor-compressor 3 is the intake manifold 2. The pressure at the manifold is low and the pressure differential across the pump 6 is not significant. Under such conditions the reduced pressure of the manifold is communicated through conduit 16 to chamber 23 at the top side of the diaphragm 28 and the relatively greater atmospheric pressure in the lower chamber displaces the diaphragm into chamber 23 and opens valve 26 against the resistance of a valve closing spring 32 compressed between the top side of the valve and upper end of the valve body. The reduced pressure is thereupon communicated to the pump 6 through conduit 12 and to the vacuum motor 3 through conduit 9. Where the air flow thus induced is greater than can readily pass through the pump 6, and the latter operates as a block, the resulting pressure differential across the pump will cause the check valve 21 to open against the resistance of its valve closing spring 33 thereby opening the line across the pump through conduits 18 and 19.

As the engine speed increases and the output of the pump 6 becomes significant, the higher pressure in line 12 with respect to line 9 causes the check valve 21 to close, and the pump 6 operates as a vacuum booster for the manifold, the two sources being connected in series to the vacuum motor 3. So long as the reduced pressure at the manifold remains of a significant amount, valve 26 will be held open and the two energy sources are utilized in conjunction for driving the motor 3. As the reduced pressure at the manifold fades with higher engine speeds and open throttle, the pressure differential across the diaphragm 28 decreases to a point where the force imparted by spring 32 is sufficient to close valve 26. This action shuts off the flow to the intake manifold when the relatively elevated pressure conditions thereat make the same useless as a source of energy, and at the same time prevents, under such conditions, the undesirable charging of the engine with air when maximum power output of the engine is attained. As the manifold is thus taken out of operation as an energy source, the whole load is carried by the pump 6 which as aforesaid developes its maximum output at high engine speeds. On closing of valve 26, pressure builds up in chamber 22 and forces the opening of a pop-off check valve 34 provided in chamber 22. This valve is normally held in a seated closed position by a spring 36 and is mounted in a valve chamber 37 ported to the atmosphere at its outer end 38. As the pressure in chamber 22 increases above atmospheric, the valve 34 is displaced from its seat and the chamber vented to the atmosphere. Upon subsequent closing of the carburetor air valve, and reestablishment of the manifold as a usable source of energy, valve 26 is automatically opened by the reduced pressure at the top of the diaphragm, valve 34 automatically seats due to the drop in pressure in chamber 22, and the reduced manifold pressure is thus thrown back into the circuit to operate jointly with the pump 6 or alone depending upon the energy then being developed by the pump.

In accordance with the foregoing it will be understood that the manifold 2 and the pump 6 provide two sources of energy for motivating the motor 3 and that these sources are generally complementary throughout the range of operation of the engine 1, in that one normally increases in power as the other decreases and vice versa; and that the present invention harnesses these two sources in such a manner that the same are automatically put into and taken out of operation so that the same carry the load singly or jointly as the energy generated by each respectively exceeds or falls below a predetermined level.

I claim:

A mechanism adapted for use in connection with the intake manifold of an internal combustion engine for operatively connecting and motivating the vacuum motor for a refrigerating apparatus of the character described, comprising, a vacuum air pump and means for connecting same to said engine to provide a pump capacity in proportion to the speed of said engine, a conduit connecting the intake manifold to the discharge side of the said pump; a pressure operated flow control valve mechanism inserted in said conduit and being responsive to the intake pressure in said manifold to connect said pump and manifold when said pressure is below a predetermined amount and to close the connection to said manifold and connect said pump to the atmosphere when said pressure is above said amount, the intake side of said pump being connected to said motor, and a pressure operated valve inserted in a conduit short circuiting said pump and responsive to the pressure differential across said pump to respectively open and close the air passage through said last named conduit when the pressure differential across said pump is below and above a predetermined amount.

JOSEPH PIEROTTI.